(12) United States Patent
Gupta

(10) Patent No.: US 11,194,928 B2
(45) Date of Patent: Dec. 7, 2021

(54) TEMPLATE-BASED IDENTIFICATION AND REMOVAL OF STORED PERSONAL INFORMATION

(71) Applicant: International Business Machines Corporation, Armonk, NY (US)

(72) Inventor: Manish Gupta, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 262 days.

(21) Appl. No.: 16/435,683

(22) Filed: Jun. 10, 2019

(65) Prior Publication Data

US 2020/0387626 A1    Dec. 10, 2020

(51) Int. Cl.
  *H04L 9/00*     (2006.01)
  *G06F 21/00*    (2013.01)
  *G06F 21/62*    (2013.01)

(52) U.S. Cl.
  CPC ...... *G06F 21/6245* (2013.01); *G06F 21/6281* (2013.01)

(58) Field of Classification Search
  CPC .......................... G06F 21/6245; G06F 21/6281
  See application file for complete search history.

(56) References Cited

U.S. PATENT DOCUMENTS

| | | | |
|---|---|---|---|
| 9,317,715 B2 | 4/2016 | Schuette et al. | |
| 9,600,685 B2 | 3/2017 | Thomas et al. | |
| 2013/0138569 A1* | 5/2013 | Yan | G06Q 30/0261 705/50 |
| 2013/0304542 A1* | 11/2013 | Powell | G16H 10/20 705/7.32 |
| 2015/0193638 A1* | 7/2015 | Cook | G06Q 20/34 726/27 |

(Continued)

FOREIGN PATENT DOCUMENTS

WO    2019008548 A1    1/2019

OTHER PUBLICATIONS

Microsoft, Achieve digital business transformation, https://www.microsoft.com/en-us/enterprise?rtc=1, 2019.

(Continued)

*Primary Examiner* — Alexander Lagor
(74) *Attorney, Agent, or Firm* — Garg Law Firm, PLLC; Rakesh Garg; Ken Han

(57) ABSTRACT

A set of potential personal information (PI) is constructed. A first data component of a first potential PI in the set of potential PI conforms to each element of a delimited alphanumeric string defining a PI search pattern. A first metadata component of the first potential PI comprises system information of a system maintaining the first potential PI. Responsive to determining that a component of the first potential PI meets a specification of a component of a signature, the first potential PI is identified as a first actual PI, wherein the signature comprises a data component specifying an alphanumeric string and a metadata component specifying a delimited alphanumeric string defining a metadata search pattern. Using a removal request constructed responsive to identifying the first actual PI, removal of the first data component from data maintained by the system maintaining the first potential PI is caused.

14 Claims, 8 Drawing Sheets

(56) References Cited

U.S. PATENT DOCUMENTS

2017/0161520 A1* 6/2017 Lockhart, III ...... G06F 21/6263

OTHER PUBLICATIONS

Brewer, Personal Data, Privacy, and the GDPR, https://www.red-gate.com/simple-talk/opinion/opinion-pieces/personal-data-privacy-gdpr/, May 10, 2017.
Intersoft Consulting, Right to erasure ('right to be forgotton'), https://gdpr-info.eu/art-17-gdpr/, 2019.
Crow et al., GDPR deep dive—how to implement the 'right to be forgotten', https://www.bankinghub.eu/banking/finance-risk/gdpr-deep-dive-implement-right-forgotten, Nov. 2017.

* cited by examiner

TEMPLATE-BASED IDENTIFICATION AND REMOVAL OF STORED PERSONAL INFORMATION

TECHNICAL FIELD

The present invention relates generally to a method, system, and computer program product for managing personal information data. More particularly, the present invention relates to a method, system, and computer program product for template-based identification and removal of stored personal information.

BACKGROUND

As users use websites and applications exchanging data over a network such as the Internet, systems storing users' personal information have proliferated. As used herein, personal information means any information relating to an identified or identifiable natural person. An identifiable natural person is one who can be identified, directly or indirectly, by reference to an identifier such as a name, an identification number, location data, an online identifier or to one or more factors specific to the physical, physiological, genetic, mental, economic, cultural or social identity of that natural person. Some examples of personal information are a person's full name, home address, personal telephone number, and identification number such as a Social Security number (for United States taxpayers).

In different governmental jurisdictions, different laws, regulations, and guidance documents govern the storage, use, and communication of personal information, or particular types of personal information. In addition, users themselves have an interest in limiting others' access to their personal information, or particular types or portions of their personal information. In some jurisdictions, users have the right to ask that their personal information be removed from a service that maintains such information. In addition, a service that maintains personal information may want to offer users the ability to have their personal information removed, even in the absence of a specific mandate to do so.

SUMMARY

The illustrative embodiments provide a method, system, and computer program product. An embodiment includes a method that constructs a set of potential personal information (PI), each potential PI in the set of potential PI comprising a data component and a metadata component, wherein a first data component of a first potential PI in the set of potential PI conforms to each element of a delimited alphanumeric string defining a PI search pattern, wherein a first metadata component of the first potential PI comprises system information of a system maintaining the first potential PI. An embodiment identifies, responsive to determining that a component of the first potential PI meets a specification of a component of a signature, the first potential PI as a first actual PI, wherein the signature comprises a data component specifying an alphanumeric string and a metadata component specifying a delimited alphanumeric string defining a metadata search pattern. An embodiment causes, using a removal request constructed responsive to identifying the first actual PI, removal of the first data component from data maintained by the system maintaining the first potential PI, the removal request comprising a data component and a metadata component associated with the first potential PI.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
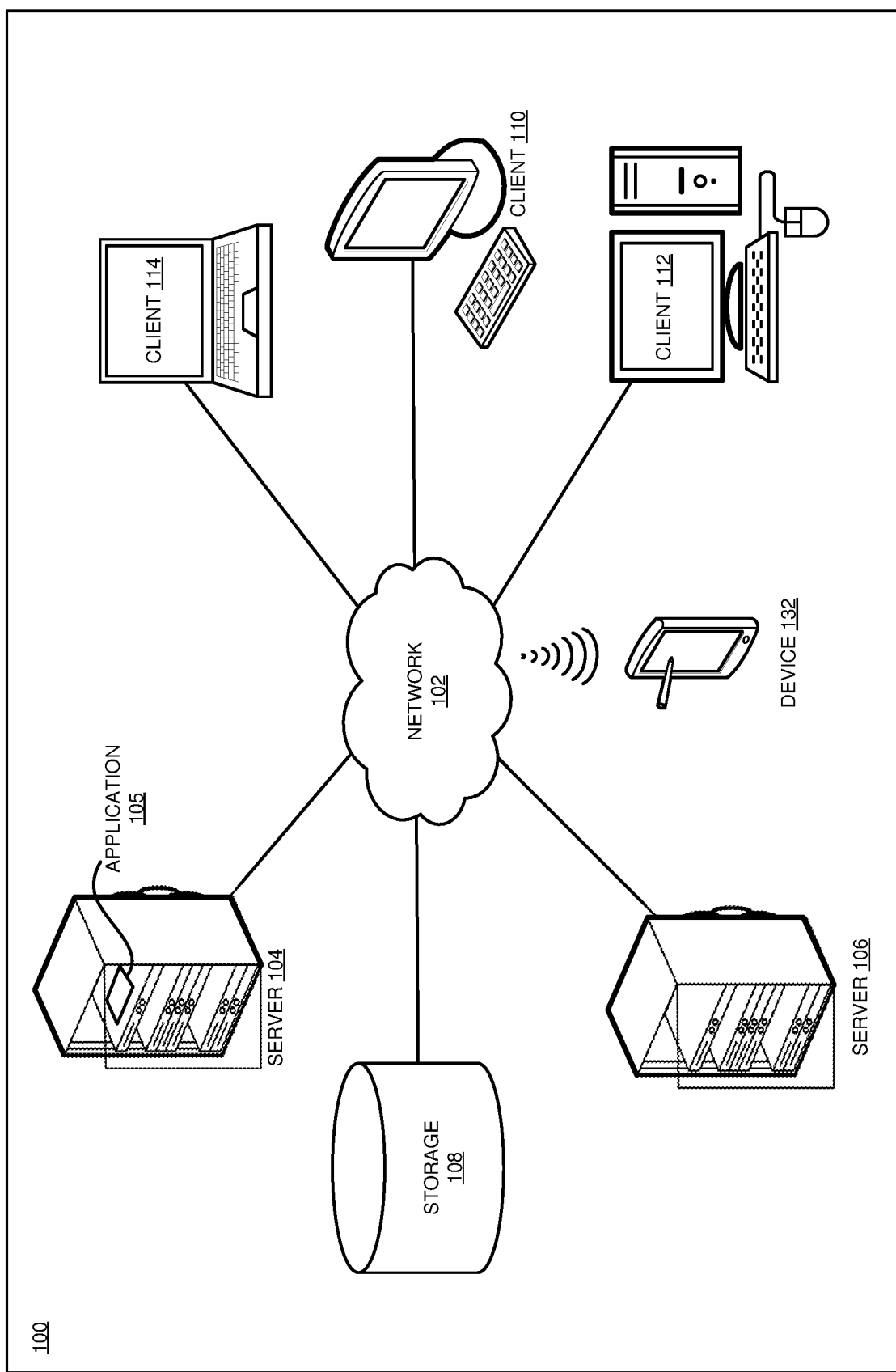
FIG. 1 depicts a block diagram of a network of data processing systems in which illustrative embodiments may be implemented.

The illustrative embodiments recognize that, to conform to requirements or expectations regarding storage, use, and communication of personal information, a maintainer of personal information needs to ensure that personal information that should not be present on a service is actually not present on the service. However, ensuring that this is the case is not always easy. A service maintaining personal information may actually consist of a set of services, each holding data and performing a specific task. In such a configuration, locating and removing all the required personal information, from all of the services, requires an understanding of each system's personal information maintenance implementation.

The illustrative embodiments also recognize that personal information thought to have been removed can reappear. Because services communicate with each other, personal information overlooked on one system can migrate back through the set of services. In addition, although personal information may have been successfully removed from the entire set of services, a storage backup may still include the information. If a storage area used by one of the services is restored from that backup, the personal information can also reappear in one or more of those services. In addition, a user's personal information may have been successfully removed from a set of services, then the same user interacts again with the set services, thus generating new personal information. However, that user's original removal request may still be in force, requiring that the new personal information also be removed.

Consequently, the illustrative embodiments recognize that there is a need to monitor a service maintaining personal information, raise an alert if personal information is found that should not be present, and remove such personal information if possible. There is also a need to monitor data moving through a set of services, and being restored from backups, to determine if personal information is being moved or restored that should not be. As well, because personal information must be protected from proliferation, there is a need for security measures to protect the personal information during monitoring and identifying particular personal information.

The illustrative embodiments recognize that the presently available tools or solutions do not address these needs or provide adequate solutions for these needs. The illustrative embodiments used to describe the invention generally address and solve the above-described problems and other problems related to template-based identification and removal of stored personal information.

An embodiment can be implemented as a software application. The application implementing an embodiment can be configured as a modification of an existing system that maintains personal information, as a separate application that operates in conjunction with an existing system that maintains personal information, a standalone application, or some combination thereof.

Particularly, some illustrative embodiments provide a method that collects information that may be personal information, identifies particular personal information from within the collection, and removes the identified personal information.

An embodiment includes one or more templates. Each template is a regular expression. A regular expression is an alphanumeric string that defines a search pattern. A search pattern specifies a set of alphanumeric strings that are required for a particular purpose.

As used herein, potential personal information is information that appears to be personal information, but requires further classification to determine if the potential personal information is indeed personal information. For example, a telephone number can be a public number associated with a business, or a private number associated with a particular person. Accordingly, a telephone number can be considered potential personal information, requiring further classification to determine if the phone number is a private, personal number and hence actual personal information.

Potential personal information often takes a particular form that is amenable to a search using a search pattern. For example, an email address typically takes a form name@address, where name is the name of the addressee and address is a particular domain name. Thus, the search pattern "*@*", calling for a match of any number of characters (denoted by the first * character), followed by an @, followed by another match of any number of characters, matches all strings having the name@address form, such as john@doe.com.

An embodiment searches data maintained on a system, constructing a set of potential personal information matching one or more of the search patterns. One embodiment searches the system on command. Another embodiment searches the system according to a periodic schedule. Another embodiment monitors, or performs a one-time or periodic search of, data moving through a set of services or being restored from backups. For example, in an embodiment that considers an email address to be potential personal information, the embodiment could use the search pattern "*@*" to construct a set of email addresses stored on a system being searched or monitored.

To avoid exposing potential personal information to unauthorized entities, one embodiment runs and stores potential personal information on a system on the same side of a firewall as a system being searched. Another embodiment performs a one-way hash operation on a data component of potential personal information before sending the hashed data component to another portion of the embodiment located on the opposite side of a firewall as a system being searched. A one-way hash operation is a mathematical algorithm that maps data of arbitrary size to a bit string of a fixed size (a hash). A one-way hash operation is computationally infeasible to invert, meaning that obtaining the original input data from the hash requires trying all possible sets of input data to determine which matches the hash, taking more computation time than is practical. A one-way hash operation is deterministic, meaning the same input data always results in the same hash. As a result, if two pieces of input data are the same, their respective hashes will also be the same. Some common example one-way hash algorithms include Advanced Encryption Standard (AES), Secure Hash Algorithm 2 (SHA-2), and Secure Hash Algorithm 3 (SHA-3), although an embodiment can use any suitable one-way hash algorithm having a desired level of security. Transporting and storing potential personal information in hashed form improves security of the personal information.

An embodiment also collects metadata corresponding to each unit of potential personal information. Metadata is data that describes the corresponding potential information. However, metadata is not in itself potential personal information. In particular, an embodiment can use metadata to describe a type of the potential personal information (e.g. a telephone number or an email address) or identify a system or service where the potential personal information was found (e.g. a service name or service unique identification (UID)). Because metadata is not in itself potential personal information, it does not need to be hashed before being sent to a location outside a system firewall. Thus, each unit of potential personal information includes two components: a data component (the potential personal information, optionally hashed) and a metadata component (data describing the potential personal information, not requiring hashing).

An embodiment receives a signature. A signature specifies particular personal information that an embodiment should locate and, if possible, remove from a system maintaining that personal information. In particular, a signature includes two components, a data component and a metadata component.

A data component of a signature specifies one or more strings, each specifying personal information that should be located. For example, a signature data component could be "(111)555-1212", specifying that an embodiment should locate and remove instances of this particular telephone number. Another example signature data component could be "john@doe.com", specifying that an embodiment should locate and remove instances of this particular email address.

A metadata component of a signature specifies metadata corresponding to the personal information that should be located. For example, a signature metadata component could be "example.com", specifying that the personal information specified in the data component should be searched for at a system using the domain name example.com.

An embodiment also stores additional information associated with a signature. This additional information includes whether the personal information specified in the signature should be removed, if located, from a particular system, or from all systems where the information is found. The additional information also includes alert information, such as whether an alert should be generated when the personal information specified in the signature is located, removed, or another event occurs. The additional information can also include signature management information, such as a periodicity for which the specified search should be run (e.g. once a day, or once a week). The additional information can also include signature history information, such as whether and where the personal information specified in the signature was previously found.

An embodiment searches the set of potential personal information for personal information that matches information specified in a signature. This matching personal information is referred to as actual personal information. An embodiment associates each identified unit of actual personal information with the signature that matched the actual personal information.

If an embodiment performs a one-way hash operation on a data component of potential personal information, an embodiment performs the same one-way hash operation on the data component of a signature. Performing the same operation on both components allows an embodiment to compare the hashes of each component instead of comparing the unencrypted data, improving security of the personal information. In addition, hashing the data component of a signature protects the personal information in the signature from disclosure. Because it is not necessary to hash a metadata component of potential personal information, it is also not necessary to hash a metadata component of a signature. In addition, both the data component and the metadata component of a signature can be search patterns instead of exact strings to be matched. However, if an embodiment is to compare a hashed version of a signature data component with a hashed version of a potential personal information data component, a search pattern of a signature data component must be expanded into a set of exact strings, then each of the set of exact strings hashed.

If an embodiment identifies actual personal information on a system, the embodiment generates any alert specified by the signature that matched the actual personal information. For example, an alert can be an exposure alert specifying that actual personal information was found at the location specified by the metadata component of the actual personal information.

As well, if an embodiment identifies actual personal information on a system and the signature matching the actual personal information specifies that the identified information should be removed, an embodiment removes the information or sends a message to the maintaining system causing the information to be removed. The metadata component of the actual personal information contains sufficient information to identify the target of the removal request.

In particular, an embodiment uses an application program interface (API) to send and receive a removal request. One example of a suitable API is a Representational State Transfer (REST) API. Web services that conform to the REST architectural style, called RESTful web services or REST APIs, provide interoperability between computer systems using a uniform and predefined set of stateless operations. Another example of a suitable API uses Simple Object Access Protocol, a messaging protocol specification for exchanging structured information in the implementation of web services in computer networks.

If the actual personal information was previously hashed, an embodiment includes the hashed actual personal information in the removal request. An embodiment also uses the metadata component of the actual personal information to generate target information in the removal request, to assist the maintaining system in locating and removing the information.

When an embodiment executing on a system that maintains personal information receives a removal request, the embodiment uses the target information to locate and remove the information.

One embodiment maintains a log of potential personal information previously hashed and sent to another system for analysis, along with associated metadata of the potential personal information. Then, when the embodiment receives a removal request, the embodiment searches the log for a hash value matching the hash value in the removal request. If the hash value in the log matches the hash value in the removal request, the embodiment uses logged metadata associated with the matched hash value to locate and delete the actual personal information provided the embodiment has sufficient permissions to perform a delete operation in the system that is holding or hosting the personal information.

Another embodiment does not maintain a log of previously-hashed personal information, but instead uses the target information in the removal request to locate personal information that could be the target of the removal request. The embodiment then hashes and sends that information to a portion of the embodiment on another system, where a final decision as to which actual personal information should be deleted can be made. For example, a removal request might include a hashed value of an email address. The example removal request might also identify an entire column, in a database, of email addresses, but not identify the specific email address to be removed. An embodiment receiving such an example request hashes every email address in the identified column, and provides those to the system requesting removal along with sufficient metadata to identify each hashed email address in the column. The receiving embodiment matches one or more of the hashed values with the hashed value of the specific email address to be removed, then sends a confirmation back to the maintaining system of which particular email address to be removed. A particular embodiment, when provided with sufficient permissions to perform a delete operation in the maintaining system that is holding or hosting the particular email address, removes the email address from the maintaining system.

An API implementation is only one example of inter-system communication to generate and process a removal request. Other implementations are also possible and contemplated within the scope of the illustrative embodiments. In addition, if an embodiment identifying actual personal information that should be removed is running on a system hosting the actual personal information, the API implementation is not necessary and the embodiment can simply remove the actual personal information.

An embodiment that monitors a system to prevent re-appearance of personal information that should have been removed also adds the details of a removal request to a collection of actual personal information that should be monitored for and removed if detected.

The manner of template-based identification and removal of stored personal information described herein is unavailable in the presently available methods in the technological field of endeavor pertaining to personal information management. A method of an embodiment described herein, when implemented to execute on a device or data processing system, comprises substantial advancement of the functionality of that device or data processing system in constructing a set of potential personal information, identifying actual personal information matching a signature within the set of potential personal information, and causing the actual personal information to be removed.

The illustrative embodiments are described with respect to certain types of personal information, data, metadata, components, system identifications, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
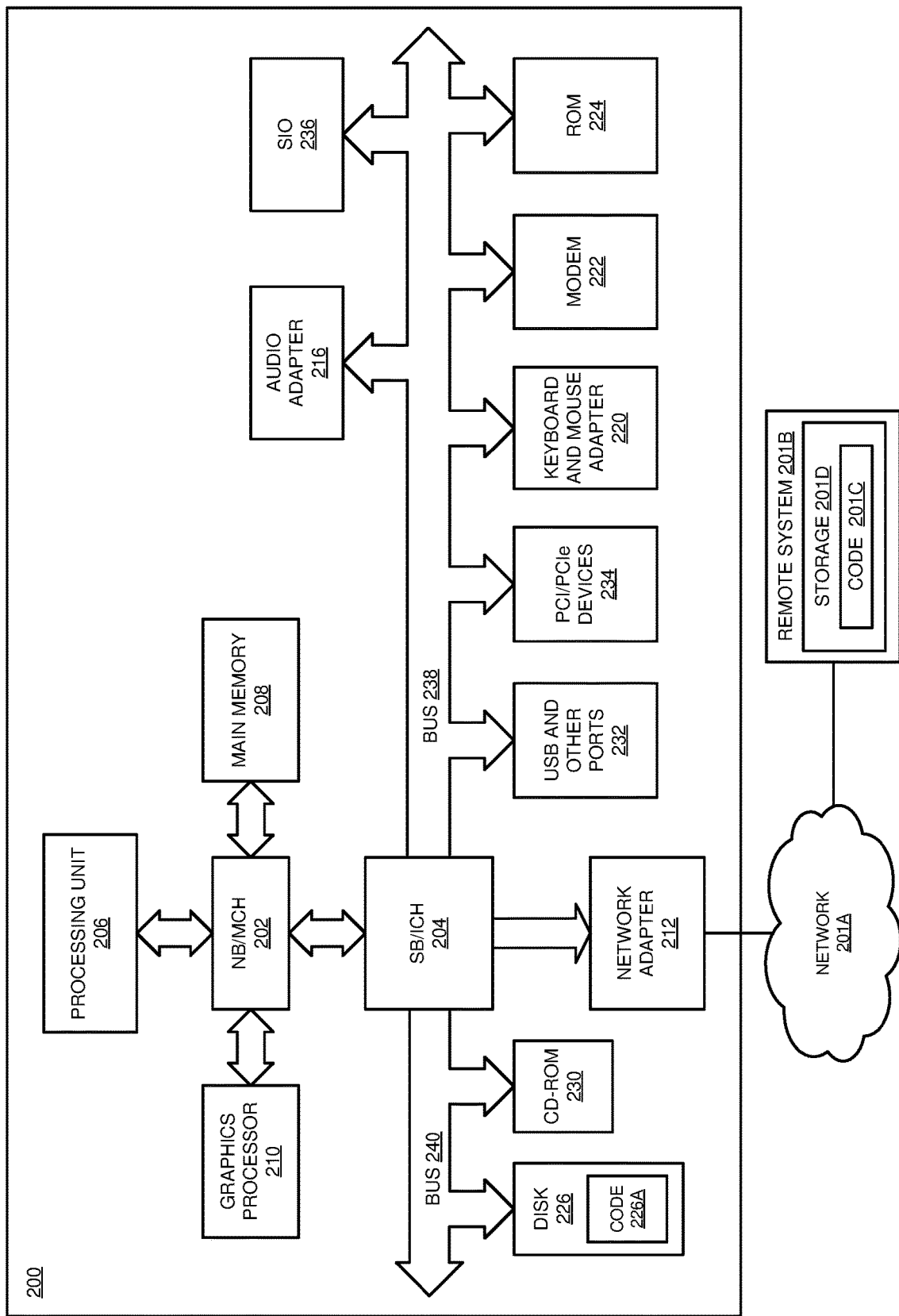
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can run in any suitable system, such as data processing systems 104, 106, 110, 112, and 114 and device 132, to process potential personal information stored on the same system in which application 105 runs. Alternatively, a portion of application 105 can run in any suitable system, sending hashed potential personal information to another system in which another portion of application 105 runs.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
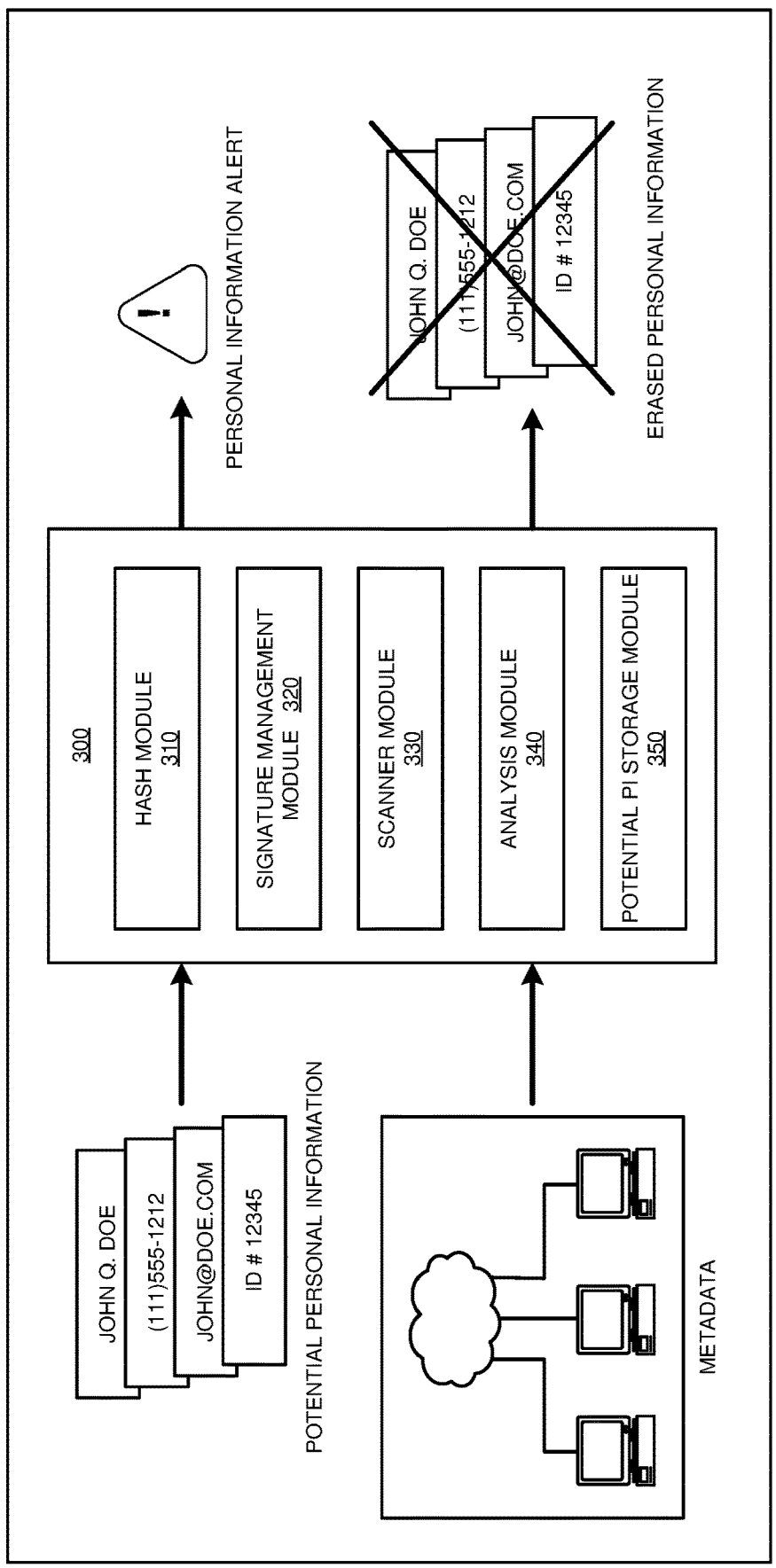
FIG. 3 depicts a block diagram of an example configuration for template-based identification and removal of stored personal information in accordance with an illustrative embodiment.

With reference to FIG. 3, this figure depicts a block diagram of an example configuration for template-based identification and removal of stored personal information in accordance with an illustrative embodiment. Application 300 is an example of application 105 in FIG. 1 and executes in any of servers 104 and 106, clients 110, 112, and 114, and device 132 in FIG. 1.

Hash module 310 performs a one-way hash operation on a data component of potential personal information. Hash module 310 also performs the same one-way hash operation on the data component of a signature. Performing the same operation on both data components allows application 300 to compare the hashes of each component instead of comparing the unencrypted data. In addition, transporting and storing data components in hashed form improves security of the personal information.

Signature management module 320 manages one or more signatures. For each signature, module 320 stores a data component specifying one or more strings, each specifying personal information that should be located. For each signature, module 320 also stores a metadata component corresponding to the data component. For each signature, module 320 also stores additional information associated with the signature, including whether the personal information specified in the signature should be removed, if located, from a particular system, or from all systems where the information is found. The additional information also includes alert information, such as whether an alert should be generated when the personal information specified in the signature is located, removed, or another event occurs. The additional information can also include signature management information, such as a periodicity for which the specified search should be run (e.g. once a day, or once a week). The additional information can also include signature history information, such as whether and where the personal information specified in the signature was previously found and optionally, removed.

Scanner module 330 searches data maintained on a system, constructing a set of potential personal information matching one or more of the search patterns. Each unit of potential personal information includes a data component (the potential personal information, optionally hashed) and a metadata component (data describing the potential personal information, not requiring hashing).

Analysis module 340 searches the set of personal information for personal information that matches information specified in a signature, i.e. actual personal information. Analysis module 340 associates each identified unit of actual personal information with the signature that matched the actual personal information.

In addition, if module 340 identifies actual personal information on a system, module 340 generates any alert specified by the signature that matched the actual personal information. For example, an alert can be an exposure alert specifying that actual personal information was found at the location specified by the metadata component of the actual personal information.

As well, if module 340 identifies actual personal information on a system and the signature matching the actual personal information specifies that the identified information should be removed, module 340 generates a removal request for the information. The metadata component of the actual personal information contains sufficient information to identify the target of the removal request.

Potential personal information (PI) storage module 350 stores potential PI, optionally with its data component in hashed form. The potential PI was obtained by scanner module 330 for analysis by analysis module 340.

Figure 4:
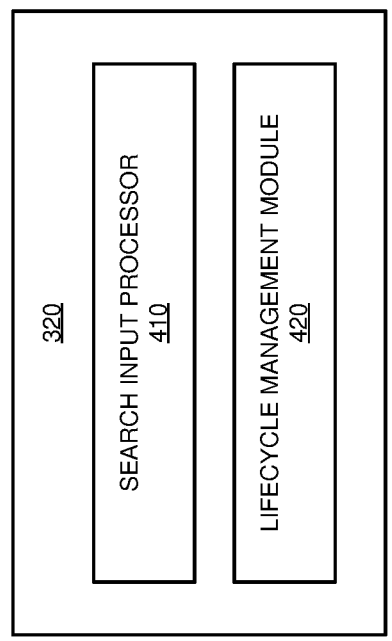
FIG. 4 depicts another block diagram of an example configuration for template-based identification and removal of stored personal information in accordance with an illustrative embodiment.

With reference to FIG. 4, this figure depicts another block diagram of an example configuration for template-based identification and removal of stored personal information in accordance with an illustrative embodiment. In particular, FIG. 4 depicts more detail of signature management module 320 in FIG. 3.

Search input processor 410 receives a signature including a data component and a metadata component. If the data component is a search pattern instead of an exact strings to be matched, and if the data component of the signature will require hashing, module 410 expands the search pattern into a set of exact strings, then uses hash module 310 to hash each exact string for comparison with hashed potential personal information.

Lifecycle management module 420 stores and manages additional information associated with a signature. The additional information includes whether the personal information specified in the signature should be removed, if located, from a particular system, or from all systems where the information is found. The additional information also includes alert information, such as whether an alert should be generated when the personal information specified in the signature is located, removed, or another event occurs. The additional information can also include signature management information, such as a periodicity for which the specified search should be run (e.g. once a day, or once a week), or whether the subject of the specified search should be monitored for. The additional information can also include signature history information, such as whether and where the personal information specified in the signature was previously found.

Figure 5:
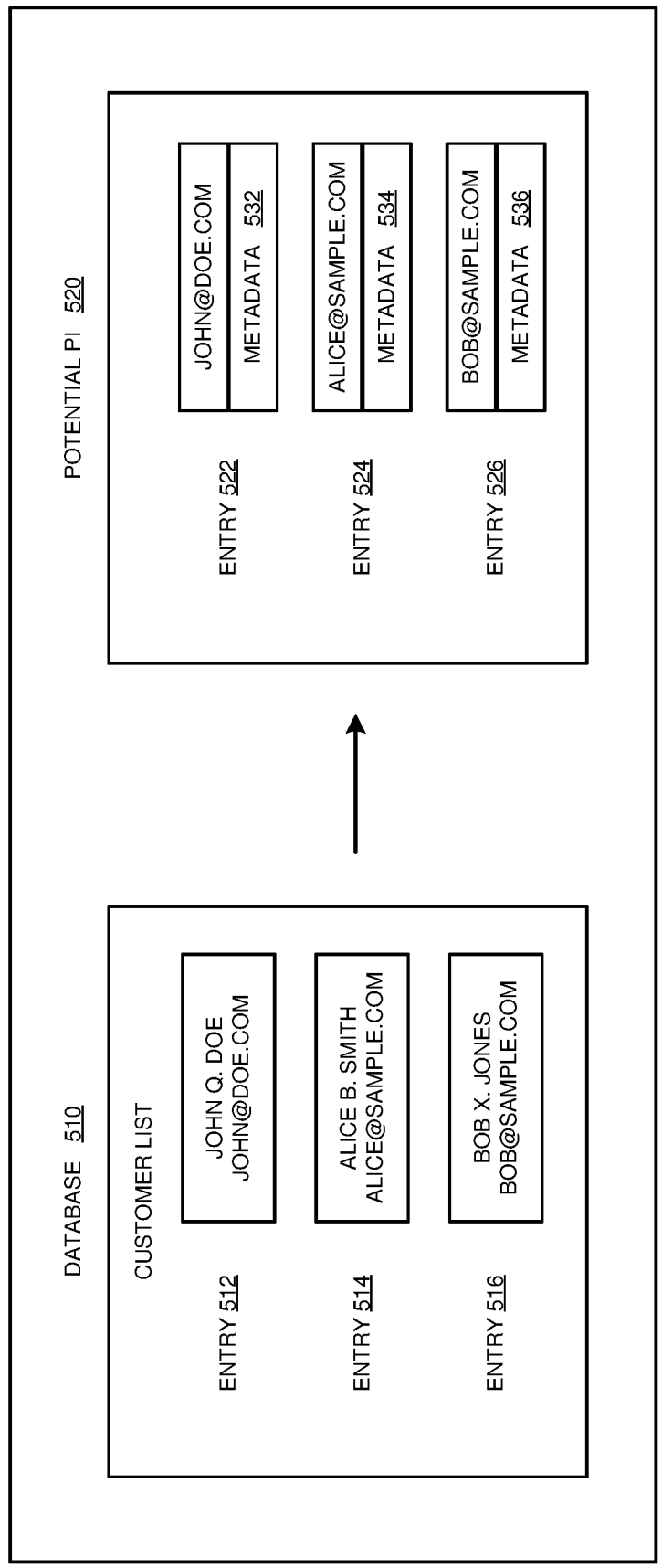
FIG. 5 depicts an example of template-based identification and removal of stored personal information in accordance with an illustrative embodiment.

With reference to FIG. 5, this figure depicts an example of template-based identification and removal of stored personal information in accordance with an illustrative embodiment. The example can be implemented using application 300 in FIG. 3.

In particular, database 510 on a system being searched for potential personal information includes a customer list. The customer list includes entries 512, 514, and 516. Each of entries 512, 514, and 516 includes a person's name and email address.

Application 300 searches database 510 and constructs potential PI 520 matching one or more search patterns. In this example, the search patterns include a search pattern that detects a customer's email address—for example, the search pattern "*@*". As a result, potential PI 520 includes entries 522, 524, and 526. Each of entries 522, 524, and 526 includes an email address. As well, each of entries 522, 524, and 526 includes corresponding metadata 532, 534, and 536. Metadata 532, 534, and 536 describe a type of the potential personal information (here, an email address) and identify a system or service where potential personal information 520 was found.

Figure 6:
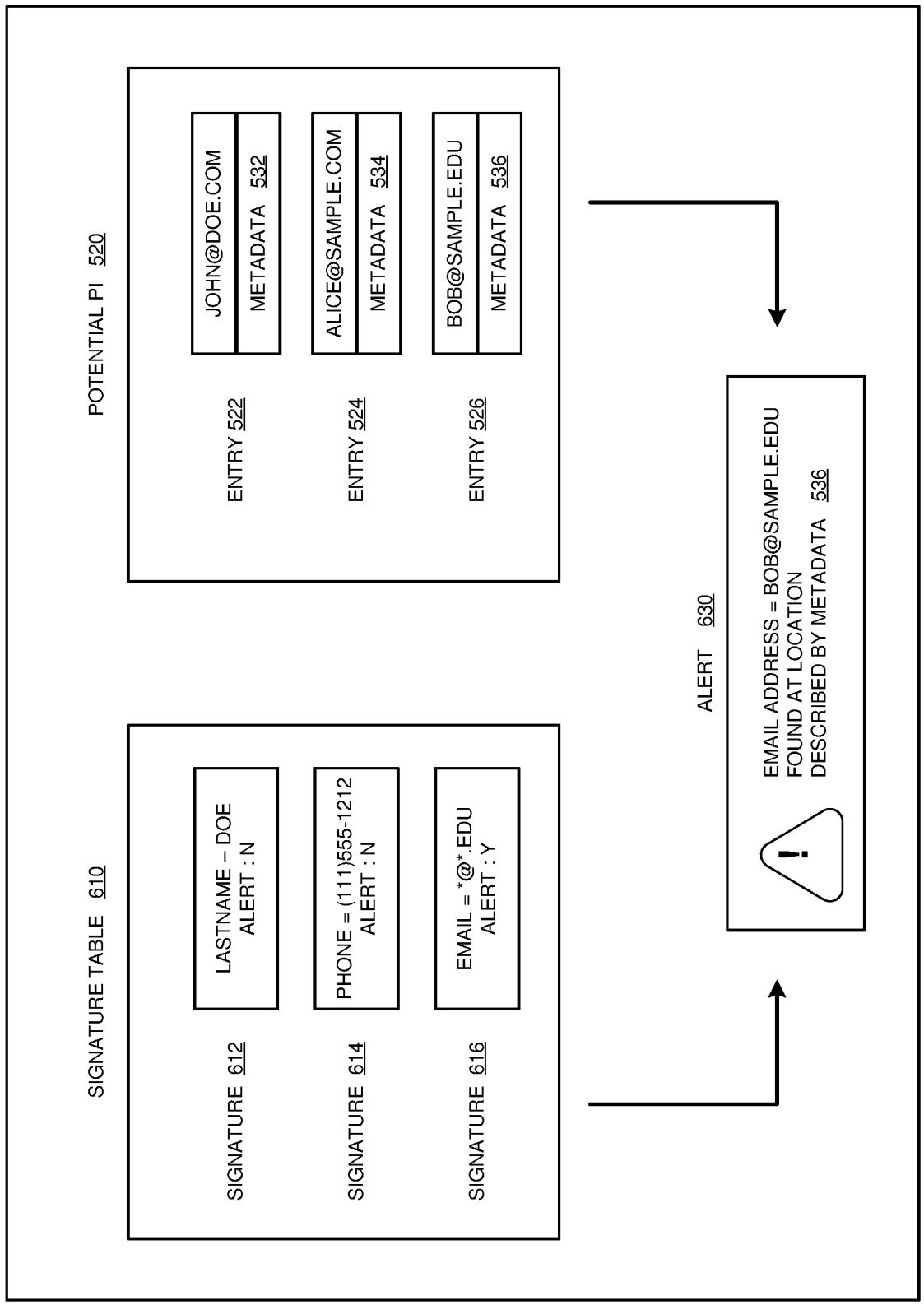
FIG. 6 depicts a continuing example of template-based identification and removal of stored personal information in accordance with an illustrative embodiment.

With reference to FIG. 6, this figure depicts a continuing example of template-based identification and removal of stored personal information in accordance with an illustrative embodiment. Potential PI 520, entries 522, 524, and 526, and metadata 532, 534, and 536 are the same as potential PI 520, entries 522, 524, and 526, and metadata 532, 534, and 536 in FIG. 5. The example can be implemented using application 300 in FIG. 3.

Application 300 receives signature table 610, including signatures 612, 614, and 616. From the information in each of signatures 612, 614, and 616, application 300 creates a data component and a metadata component. In particular, the data component for signature 616 includes a search pattern "*@*.edu", indicating that an email address ending in ".edu" is personal information that should be located. As well, additional information for signature 616 includes that an alert should be generated when the personal information specified in signature 616 is located.

Application 300 searches potential personal information 520 for personal information that matches information specified in signature table 610. As a result, application 300 determines that entry 526, including the email address "bob@sample.edu" and corresponding metadata 536, matches the search pattern in signature 616. As a result, application 300 generates alert 630, indicating that the email address "bob@sample.edu" has been found at the location described in metadata 536.

Figure 7:
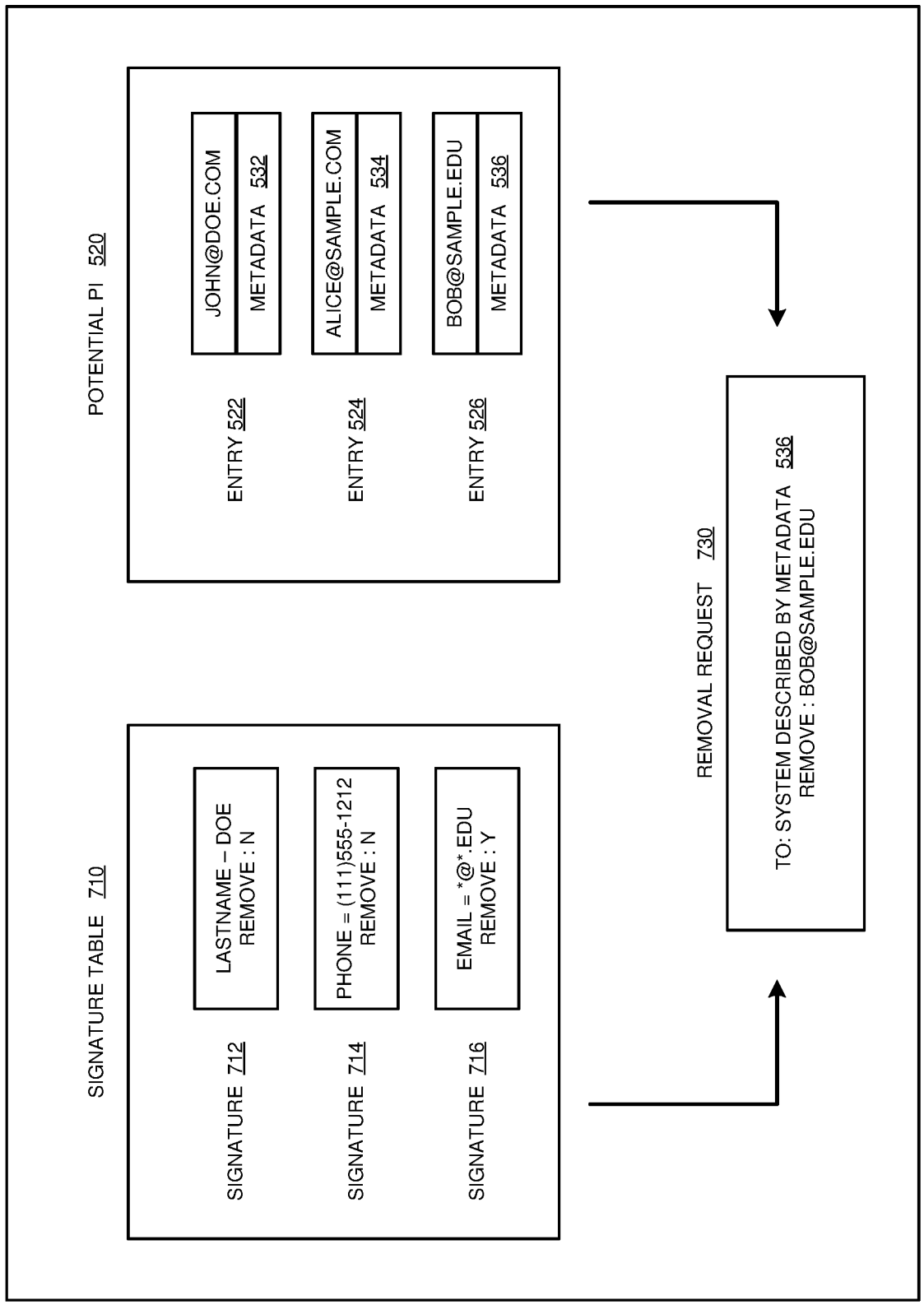
FIG. 7 depicts a continuing example of template-based identification and removal of stored personal information in accordance with an illustrative embodiment.

With reference to FIG. 7, this figure depicts a continuing example of template-based identification and removal of stored personal information in accordance with an illustrative embodiment. Potential PI 520, entries 522, 524, and 526, and metadata 532, 534, and 536 are the same as potential PI 520, entries 522, 524, and 526, and metadata 532, 534, and 536 in FIG. 5. The example can be implemented using application 300 in FIG. 3.

Application 300 receives signature table 710, including signatures 712, 714, and 716. From the information in each of signatures 712, 714, and 716, application 300 creates a data component and a metadata component. In particular, the data component for signature 716 includes a search pattern "*@*.edu", indicating that an email address ending in ".edu" is personal information that should be located. As well, additional information for signature 716 includes that when the personal information specified in signature 716 is located, it should be removed.

Application 300 searches potential personal information 520 for personal information that matches information specified in signature table 710. As a result, application 300 determines that entry 526, including the email address "bob@sample.edu" and corresponding metadata 536, matches the search pattern in signature 716. As a result, application 300 generates removal request 730, requesting that the system described in metadata 536 remove the email address "bob@sample.edu".

Figure 8:
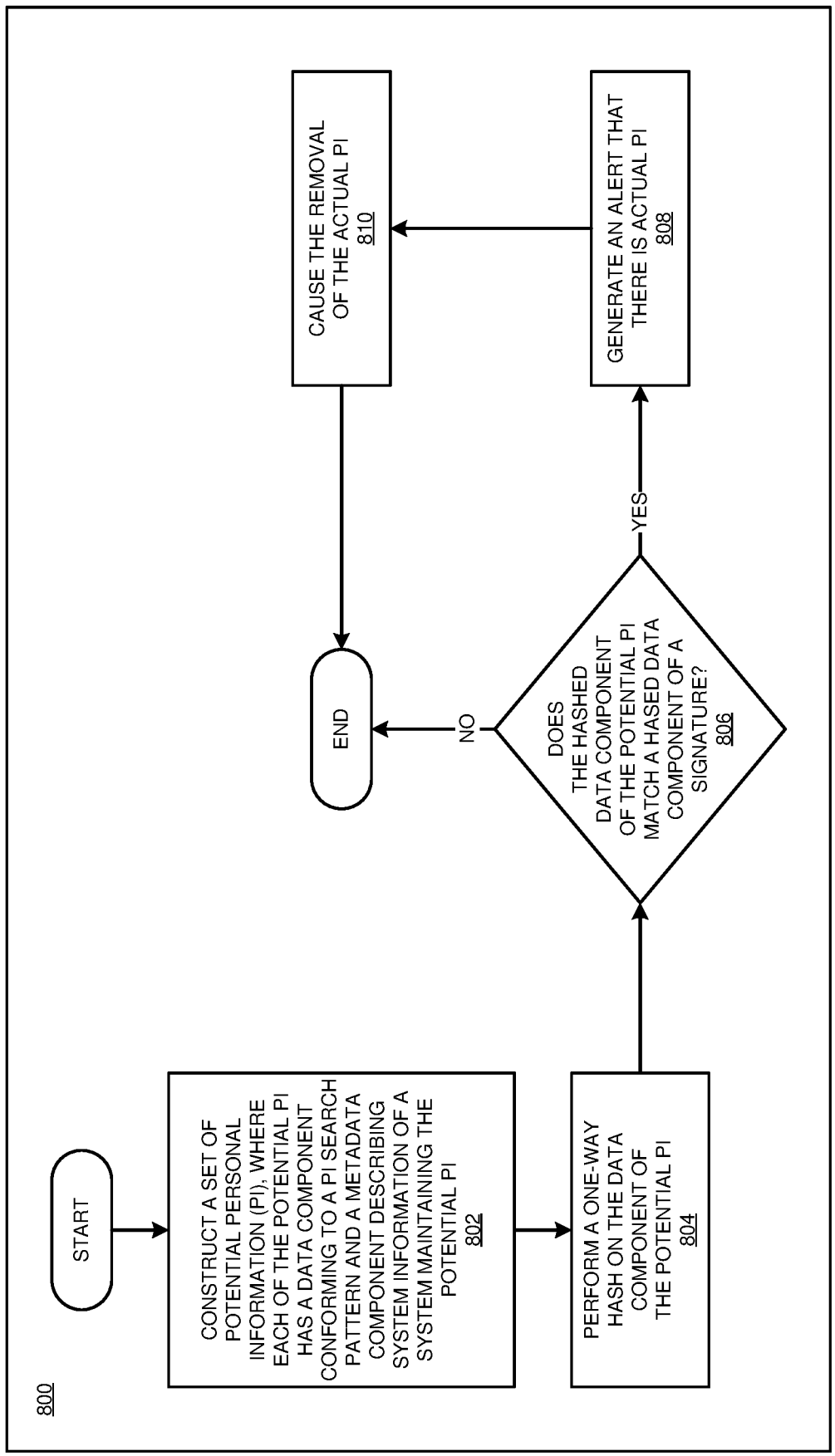
FIG. 8 depicts a flowchart of an example process for template-based identification and removal of stored personal information in accordance with an illustrative embodiment.

With reference to FIG. 8, this figure depicts a flowchart of an example process for template-based identification and removal of stored personal information in accordance with an illustrative embodiment. Process 800 can be implemented in application 300 in FIG. 3.

In block 802, the application constructs a set of potential personal information, where each of the potential PI has a data component conforming to a PI search pattern and a metadata component describing system information of a system maintaining the potential PI. In block 804, the application performs a one-way hash on the data component of the potential PI. In block 806, the application determines whether the hashed data component of the potential PI matches a hashed data component of a signature. If not ("NO" path of block 806), the application ends. If yes, ("YES" path of block 806), in block 808 the application generates an alert that there is actual PI. In block 810, the application causes the removal of the actual PI. Then the application ends.

Thus, a computer implemented method, system or apparatus, and computer program product are provided in the illustrative embodiments for template-based identification and removal of stored personal information and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
constructing a set of potential personal information (PI), each potential PI in the set of potential PI comprising a data component and a metadata component, wherein a first data component of a first potential PI in the set of potential PI conforms to each element of a delimited alphanumeric string defining a PI search pattern, wherein a first metadata component of the first potential PI comprises system information of a system maintaining the first potential PI;

hashing, creating a hashed first data component of the first potential PI using a hash function, the first data component of the first potential PI;

identifying, responsive to determining that the hashed first data component of the first potential PI is equal to a hashed search term data component, the first potential PI as a first actual PI, wherein a search term comprises the hashed search term data component and a metadata component specifying a delimited alphanumeric string defining a metadata search pattern, the hashed search term data component specifying a hash of an alphanumeric string defining a PI search pattern, the hashed search term data component hashed using the hash function; and causing, using a removal request constructed responsive to identifying the first actual PI, removal of the first data component of the first potential PI from data maintained by the system maintaining the first potential PI, the removal request comprising a data component and a metadata component associated with the first potential PI.

2. The method of claim 1, further comprising:
generating, responsive to identifying the first actual PI, an exposure alert specifying the first metadata component of the first actual PI.

3. The method of claim 1, wherein the removal of the first data component is performed referencing a logged copy of the first potential PI.

4. The method of claim 1, wherein the removal of the first data component is performed referencing the metadata component.

5. The method of claim 1, wherein the removal of the first data component is subject to a permission requirement.

6. The method of claim 1, wherein the data component of the removal request comprises the hashed first data component of the first potential PI.

7. A computer usable program product comprising one or more computer-readable storage devices, and program instructions stored on at least one of the one or more storage devices, the stored program instructions comprising:

program instructions to construct a set of potential personal information (PI), each potential PI in the set of potential PI comprising a data component and a metadata component, wherein a first data component of a first potential PI in the set of potential PI conforms to each element of a delimited alphanumeric string defining a PI search pattern, wherein a first metadata component of the first potential PI comprises system information of a system maintaining the first potential PI;

program instructions to hash, creating a hashed first data component of the first potential PI using a hash function, the first data component of the first potential PI;

program instructions to identify, responsive to determining that the hashed first data component of the first potential PI is equal to a hashed search term data component, the first potential PI as a first actual PI, wherein a search term comprises the hashed search term data component and a metadata component specifying a delimited alphanumeric string defining a metadata search pattern, the hashed search term data component specifying a hash of an alphanumeric string defining a PI search pattern, the hashed search term data component hashed using the hash function; and program instructions to cause, using a removal request constructed responsive to identifying the first actual PI, removal of the first data component of the first potential PI from data maintained by the system maintaining the first potential PI, the removal request comprising a data component and a metadata component associated with the first potential PI.

8. The computer usable program product of claim 7, further comprising:
program instructions to generate, responsive to identifying the first actual PI, an exposure alert specifying the first metadata component of the first actual PI.

9. The computer usable program product of claim 7, wherein the removal of the first data component is performed referencing a logged copy of the first potential PI.

10. The computer usable program product of claim 7, wherein the removal of the first data component is performed referencing the metadata component.

11. The computer usable program product of claim 7, wherein the removal of the first data component is subject to a permission requirement.

12. The computer usable program product of claim 7, wherein the stored program instructions are stored in a computer readable storage device in a data processing system, and wherein the stored program instructions are transferred over a network from a remote data processing system.

13. The computer usable program product of claim 7, wherein the stored program instructions are stored in a computer readable storage device in a server data processing system, and wherein the stored program instructions are downloaded over a network to a remote data processing system for use in a computer readable storage device associated with the remote data processing system.

14. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to construct a set of potential personal information (PI), each potential PI in the set of potential PI comprising a data component and a metadata component, wherein a first data component of a first potential PI in the set of potential PI conforms to each element of a delimited alphanumeric string defining a PI search pattern, wherein a first metadata component of the first potential PI comprises system information of a system maintaining the first potential PI;

program instructions to hash, creating a hashed first data component of the first potential PI using a hash function, the first data component of the first potential PI;

program instructions to identify, responsive to determining that the hashed first data component of the first potential PI is equal to a hashed search term data component, the first potential PI as a first actual PI, wherein a search term comprises the hashed search term data component and a metadata component specifying a delimited alphanumeric string defining a metadata search pattern, the hashed search term data component specifying a hash of an alphanumeric string defining a PI search pattern, the hashed search term data component hashed using the hash function;

program instructions to generate, responsive to identifying the first actual PI, an exposure alert specifying the first metadata component of the first actual PI; and program instructions to cause, using a removal request constructed responsive to identifying the first actual PI, removal of the first data component of the first potential PI from data maintained by the system maintaining the first potential PI, the removal request comprising a data component and a metadata component associated with the first potential PI, the data component of the removal request comprising the hashed first data component of the first potential PI.

* * * * *